United States Patent
Moon et al.

(10) Patent No.: US 10,762,659 B2
(45) Date of Patent: Sep. 1, 2020

(54) REAL TIME MULTI-OBJECT TRACKING APPARATUS AND METHOD USING GLOBAL MOTION

(71) Applicant: Electronics and Telecommunications Research Institute, Daejeon (KR)

(72) Inventors: Sung Won Moon, Daejeon (KR); Ji Won Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 78 days.

(21) Appl. No.: 15/942,753

(22) Filed: Apr. 2, 2018

(65) Prior Publication Data

US 2019/0012800 A1    Jan. 10, 2019

(30) Foreign Application Priority Data

Jul. 10, 2017   (KR) ........................ 10-2017-0086949

(51) Int. Cl.
*G06T 7/70* (2017.01)
*G06T 7/194* (2017.01)
(Continued)

(52) U.S. Cl.
CPC ............ *G06T 7/70* (2017.01); *G06K 9/00369* (2013.01); *G06K 9/00771* (2013.01); *G06K 9/38* (2013.01);
(Continued)

(58) Field of Classification Search
CPC .. G06T 7/70; G06T 7/20; G06T 7/194; G06T 2207/30221; G06K 9/00771; G06K 9/38;
(Continued)

(56) References Cited

U.S. PATENT DOCUMENTS

2010/0098307 A1   4/2010  Huang et al.
2011/0150284 A1*  6/2011  Son .......................... G06T 7/215
                                                                382/103
(Continued)

FOREIGN PATENT DOCUMENTS

KR   10-2010-0014554   2/2010
KR   10-2014-0061266   5/2014
(Continued)

OTHER PUBLICATIONS

Riahi, Dorra, and Guillaume-Alexandre Bilodeau. "Online multi-object tracking by detection based on generative appearance models." Computer Vision and Image Understanding 152 (2016): 88-102. (Year: 2016).*
(Continued)

*Primary Examiner* — Amandeep Saini
(74) *Attorney, Agent, or Firm* — Kile Park Reed & Houtteman PLLC (57) ABSTRACT

Provided are a real time multi-object tracking apparatus and method which use global motion, including separating a background and multiple objects from a detected image, recognizing the multiple objects separated from the background; calculating global motion information of the recognized multiple objects, which is information oriented by the multiple objects, and correcting the recognized multiple objects using the calculated global motion information and tracking the multiple objects.

12 Claims, 6 Drawing Sheets

(51) Int. Cl.
  *G06K 9/38* (2006.01)
  *G06K 9/00* (2006.01)
  *G06K 9/46* (2006.01)
  *G06T 7/20* (2017.01)
  *G06K 9/62* (2006.01)

(52) U.S. Cl.
  CPC ............ *G06K 9/4604* (2013.01); *G06T 7/194* (2017.01); *G06T 7/20* (2013.01); *G06K 9/6215* (2013.01); *G06T 2207/30221* (2013.01)

(58) Field of Classification Search
  CPC . G06K 9/00369; G06K 9/4604; G06K 9/6215
  USPC .......................................................... 382/103
  See application file for complete search history.

(56) References Cited

U.S. PATENT DOCUMENTS

| | | | |
|---|---|---|---|
| 2012/0051594 | A1 | 3/2012 | Kim et al. |
| 2013/0287250 | A1 | 10/2013 | Lee |
| 2014/0133703 | A1 | 5/2014 | Dogra et al. |
| 2014/0341442 | A1* | 11/2014 | Lewis ................ G06K 9/00248 382/118 |
| 2015/0131853 | A1* | 5/2015 | Lim ................... G06K 9/00355 382/103 |
| 2016/0148054 | A1 | 5/2016 | Han et al. |
| 2016/0196639 | A1* | 7/2016 | Shin ........................ G06T 5/003 382/201 |
| 2018/0270454 | A1* | 9/2018 | Deng ...................... G06T 7/194 |

FOREIGN PATENT DOCUMENTS

| | | |
|---|---|---|
| WO | 2008/118147 A2 | 10/2008 |
| WO | 2008/118147 A3 | 3/2009 |
| WO | WO-2016095374 A1 * | 6/2016 ............. G06T 7/194 |

OTHER PUBLICATIONS

Boris Babenko et al.; "Visual Tracking with Online Multiple Instance Learning"; CVPR 2009, pp. 983-990.

Joao F. Henriques et al.; "High Speed Tracking with Kernelized Correlation Filters"; IEEE Transactions on Pattern Analysis and Machine Intelligence; arXiv:1404.7584v3 [cs.CV]; Nov. 5, 2014, pp. 1-14.

Yaniv Taigman et al.; "DeepFace: Closing the Gap to Human-Level Performance in Face Verification"; CVPR 2014; pp. 1-8.

Alex Krizhevsky et al.; "ImageNet Classification with Deep Convolutional Neural Networks"; NIPS 2012; pp. 1-9.

* cited by examiner

FIG. 7

REAL TIME MULTI-OBJECT TRACKING APPARATUS AND METHOD USING GLOBAL MOTION

This application claims priority to and the benefit of Korean Patent Application No. 2017-0086949, filed on Jul. 10, 2017, the disclosure of which is incorporated herein by reference in its entirety.

BACKGROUND

1. Field of the Invention

The present invention relates to a real time multi-object tracking method, and more particularly, to a real time multi-object tracking apparatus and method using a global motion capable of improving the accuracy of multi-object tracking in tracking motions of multiple objects by applying global motion information of the multiple objects to a real time multi-object tracking.

2. Discussion of Related Art

Existing object tracking technologies are implemented through an online learning-based method in which a plurality of low performance learning machines are used in combination with each other (a related article is titled 'Visual tracking with online multiple instance learning, CVPR 2009') and an object tracking method in which a correlation filter is used (a related article is titled 'High-speed tracking with kernelized correlation filters, IEEE Trans on Pattern Analysis and Machine Intelligence 2014').

Existing object tracking technologies are mainly focused on research conducted on single object tracking, and thus have attained outstanding results in single object tracking.

In other words, since existing object tracking technology tracks objects using a method of detecting edge points of an object, when the existing objet tracking technology is applied to multi-object tracking, only multiple objects having a constant orientation are able to be tracked.

In addition, existing object tracking technology, which uses a method of detecting edge points of an object, is not suitable for tracking multiple objects in real time when the multiple objects include a small object, objects having significantly similar shapes as if uniform, an object in a sporting event image which has a dynamic and rapid motion.

In addition, among conventional object tracking technologies, deep learning-based technologies, such as scene recognition technology (a related article is titled 'ImageNet classification with deep convolutional neural networks, NIPS 2012'), and face recognition technology (a related article is titled 'Deepface: closing the gap to human-level performance in face verification, CVPR 2014') produce performance similar to the recognition ability of a human for a stationary image, but have problems with being applicable to real time sporting event images containing frequent occlusions and similar appearances, and with difficulty in obtaining learning data and insufficiency in speed/recognition performance.

Accordingly, there is a need for a method of tracking multiple objects in sporting events, capable of resolving the above discussed limitations and operating in real time.

To this end, first, a background subtraction method which is robust to various conditions in a stadium (illumination change, noise, and the like) and an object tracking method using object recognition which is robust to occlusion and similar appearances and based on a detected foreground region are needed, and global motion also needs to be considered to overcome the limitations of existing technologies.

SUMMARY OF THE INVENTION

The present invention is directed to providing an object tracking apparatus and method, capable of real-time tracking of multiple objects in an image in which multiple objects have vigorous dynamic motions by calculating global motion information and applying the calculated global motion information to object recognition and tracking.

The technical objectives of the present invention are not limited to the above disclosure, and other objectives may become apparent to those of ordinary skill in the art based on the following descriptions.

According to one aspect of the present invention, there is provided a method of tracking multiple objects in real time using global motion, the method including: separating a background and multiple objects from a detected image; recognizing the multiple objects separated from the background; calculating global motion information of the recognized multiple objects; and correcting the recognized multiple objects using the calculated global motion information, and tracking the multiple objects.

According to another aspect of the present invention, there is provided an apparatus for tracking multiple objects in real time using global motion, the apparatus including: a background separating unit configured to separate a background and multiple objects from a detected image; an object recognition unit configured to recognize the multiple objects separated from the background; a global information calculating unit configured to calculate global motion information of the recognized multiple objects; and an object tracking unit configured to correct the recognized multiple objects using the calculated global motion information, and track the multiple objects.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above and other advantages, features, and a scheme for the advantages of the present invention will become readily apparent with reference to the following detailed description when considered in conjunction with the accompanying drawings. However, the scope of the present invention is not limited to such embodiments, and the present invention may be realized in various forms. The embodiments to be described below are only embodiments provided to complete the disclosure of the present invention and assist those skilled in the art to completely understand the scope of the present invention. The present invention is defined only by the scope of the appended claims. Meanwhile, terms used herein are used to aid in the explanation and understanding of the present invention and are not intended to limit the scope spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Hereinafter, exemplary embodiments of the present invention will be described in detail with reference to the accompanying drawings.

Figure 1:
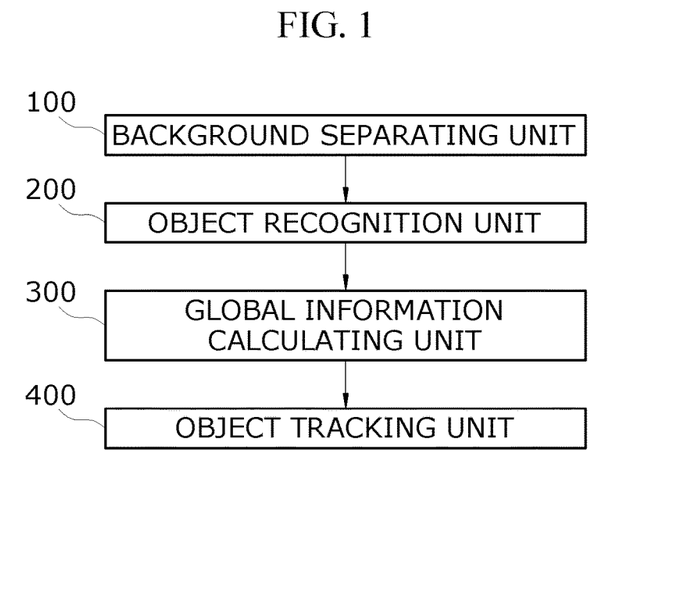
FIG. 1 is a function block diagram for describing a real time multi-object tracking apparatus which uses global motion according to an embodiment of the present invention.

FIG. 1 is a function block diagram for describing a real time multi-object tracking apparatus which uses global motion according to an embodiment of the present invention. Referring to FIG. 1, the real time multi-object tracking apparatus which uses global motion according to the embodiment of the present invention includes a background separating unit 100, an object recognition unit 200, a global information calculating unit 300, and an object tracking unit 400.

The background separating unit 100 separates a background and multiple objects from a current frame. The background separating unit 100 employed in the embodiment of the present invention separates the background and the multiple objects from each other using the following Equation 1.

$$ME^n(x) = \theta(\nabla G^*(I^n(x) - I^{n-1}(x)))$$ [Equation 1]

Here, G refers to a Gaussian filter, θ refers to a Canny edge detector, n refers to a frame number, and X refers to pixel coordinates.

The object recognition unit 200 recognizes the multiple objects separated by the background separating unit 100 from the background of the current frame.

In addition, the global information calculating unit 300 calculates global motion information, which is information oriented by the multiple objects, using the recognized multiple objects.

The object tracking unit 400 corrects the recognized multiple objects using the calculated global motion information, and tracks the multiple objects.

According to the embodiment of the present invention, unlike in the conventional single object tracking method, the multiple objects are corrected using the global motion information so that the performance of multi-object tracking may be improved.

Meanwhile, the background separating unit 100 employed in the embodiment of the present invention separates the background and the multiple objects from each other using the following Equations 2 and 3.

$$TME^n = ME^n \cup SE^n,$$ [Equation 2]

$$\text{where } SE^n(x_i) = \begin{cases} 1, & \text{if } \|x_i - x_j\| < \tau, \\ 0, & \text{otherwise} \end{cases},$$

Here, $X_i$ refers to a position of a pixel with a Canny edge value of 1 obtained from each frame, $X_j$ refers to a position of a pixel with a dynamic edge (i.e., $TME^{n-1}$) value of 1 obtained from a previous frame, τ is a threshold value of a distance limit, and n is a frame number.

$$F^n(x) = \begin{cases} 1, & \text{if } TME^n(x) = 1 \text{ and } BG^n(x) = 1,; \\ 0, & \text{otherwise} \end{cases}.$$ [Equation 3]

Here, $F^n$ is an object in a current frame, $TME^n$ is a dynamic edge, and $BG^n$ is a background detection result.

That is, the background separating unit 100 separates a background and an object from each other on the basis of a likelihood function using a brightness value of a pixel, and separates a background and an object from each other using a dynamic edge.

Then, when the object separated using the dynamic edge is included in the background separated on the basis of the likelihood function, the background separating unit 100 separates a region determined to be the object using the dynamic edge from the background separated on the basis of likelihood function.

Accordingly, when only using the conventional background separation based on the likelihood function which uses pixel brightness values, an object lacking motion or momentarily stationary may be partly processed as background. However, according to the background separating unit employed in the embodiment of the present invention, temporarily stationary objects (e.g., an athlete standing still for a moment and the like) may also be accurately detected by including, in a foreground region, a static Canny edge region detected from a frame, and thus the limitation of an object lacking a motion or momentarily stationary being processed as background is resolved.

Figure 2:
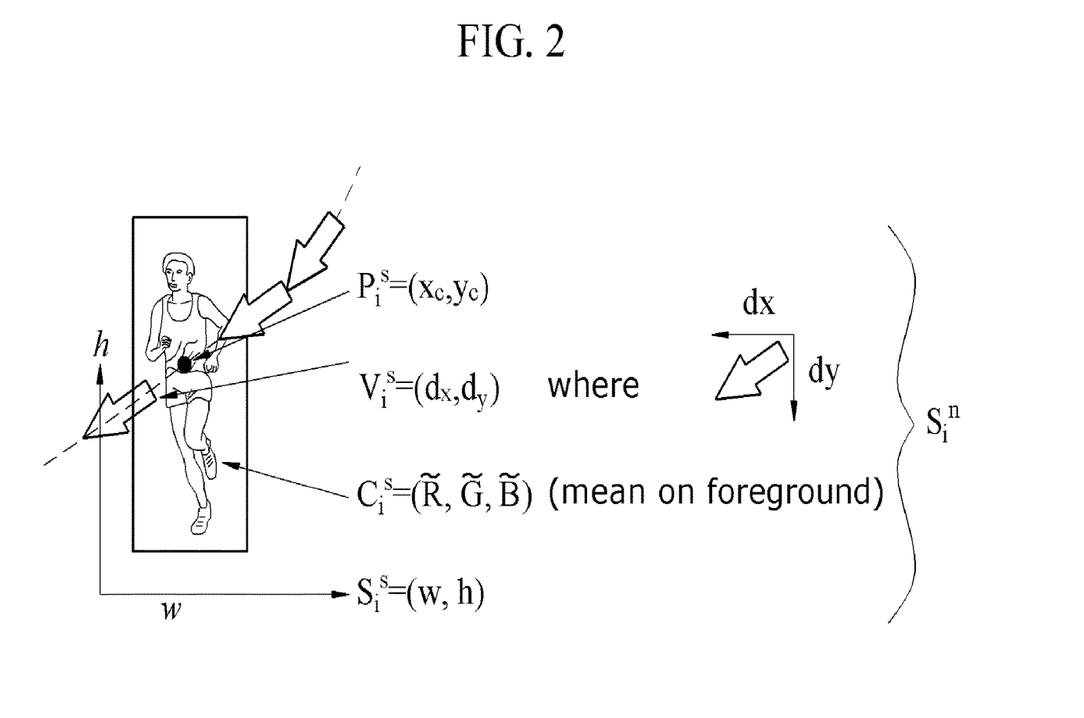
FIG. 2, FIG. 3A and FIG. 3B are reference diagrams for describing an object recognition unit according to an embodiment of the present invention.

Meanwhile, Referring to FIG. 2, the object recognition unit 200 employed in the embodiment of the present invention may set a support window region S using at least one type of information among object center coordinate information p, color information c, speed information v, and size information s.

The object recognition unit 200 employed in the embodiment of the present invention may set the size of the support window region S using minimum coordinates and maximum coordinates of a connected component (connected component analysis: CCA) within a topological space from the object center coordinate information.

Figure 3A:
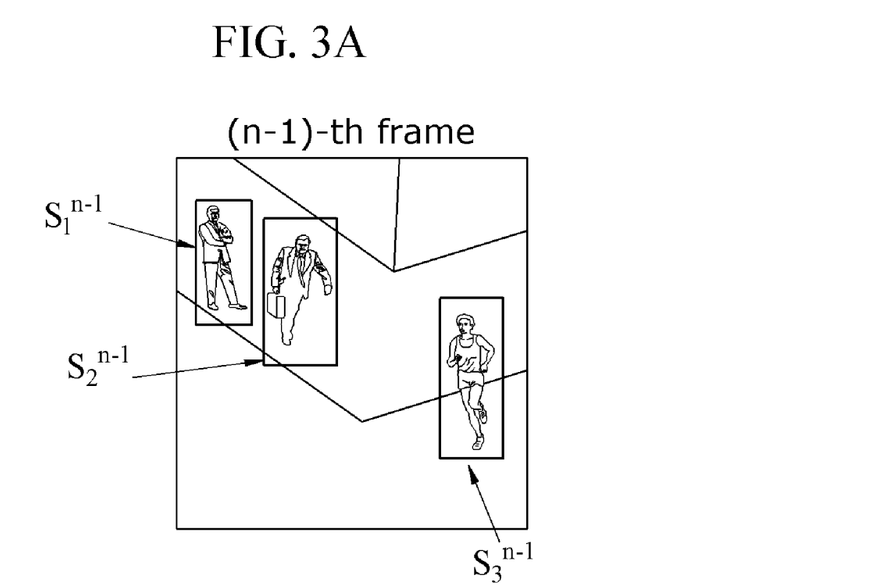
Figure 3B:
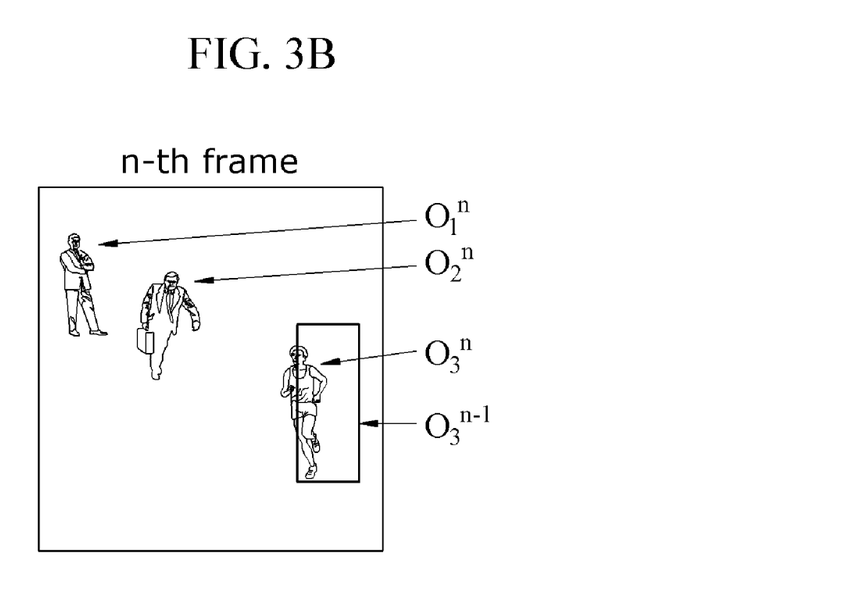

Then, Referring to FIG. 3A and FIG. 3B, the object recognition unit 200 performs sampling using multi-scales on the set support window region S, and determines a similarity between objects using information inside of an image block of the set support window region S, so that the object is recognized.

As such, according to the object recognition unit employed in the embodiment of the present invention, the support window region S is set during the tracking of multiple objects so that the object recognition speed and update speed may be improved.

In addition, the object tracking unit 400 employed in the embodiment of the present invention acquires pieces of motion information of all objects detected from a previous frame ((n-1)$^{th}$ frame) and a current frame (n$^{th}$ frame) using the object center coordinate information in the recognizing of multiple objects, calculates global motion information using the acquired pieces of motion information of the all objects, and corrects each of the objects with the calculated global motion information such that the global motion information is applied to an estimation of a position of each of the objects, thereby enhancing the efficiency of real time multi-object tracking.

The object tracking unit 400 may calculate the global motion information using the following Equation 4.

$$v^G(n) = \frac{1}{L}\sum_{k=1}^{L} \|p_i^S(n-1) - p_M^B(n)\| \qquad \text{[Equation 4]}$$

Here, V$^G$ is global motion information of an object, L is the total number of objects, P is a point coordinate value of an object, and n is a frame value.

That is, the global motion information defines an average value of motions of all objects as global motion, and the global motion information is applied to estimation of the position of each object, so that robust object recognition is performed.

According to the object tracking unit employed in the embodiment of the present invention, the global motion information is applied to the multi-object recognizing and tracking so that the speed of object tracking is improved as well as improving the accuracy of object recognizing and tracking.

Meanwhile, the object tracking unit 400 employed in the embodiment of the present invention may update center coordinate information, motion speed information, and size and color information of the object using online interpolation. By updating center coordinate information, motion speed information, and size and color information of the object using the online interpolation, the object having been recognized using the object recognition unit 200 may be continuously recognized even in a subsequent frame.

Hereinafter, a real time multi-object tracking method which uses global motion according to an embodiment of the present invention will be described with reference to FIG. 4.

Operations of the real time multi-object tracking method according to the embodiment of the present invention may each be performed by a single processor or independent processors.

Figure 4:
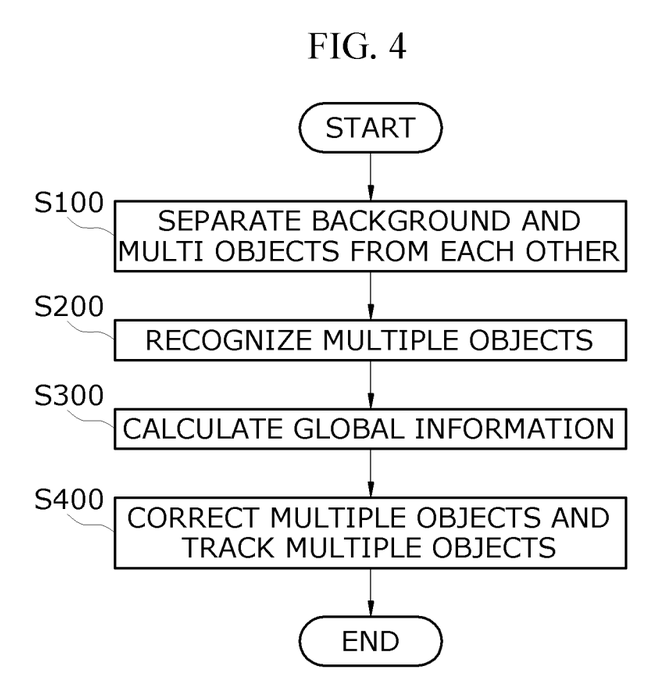
FIG. 4 is a flowchart for describing a real time multi-object tracking method which uses global motion according to an embodiment of the present invention.

Referring to FIG. 4, a background and multiple objects are separated from a current frame (S100). The background and the multiple objects are separated from each other using the above-described Equation 1.

Subsequently, the multiple objects separated from the background of the current frame are recognized (S200).

Then, global motion information of the multiple objects, which is information oriented by the recognized multiple objects, is calculated (S300). The global motion information according to the embodiment of the present invention refers to an average value of directions and distances of the multiple objects.

Subsequently, the recognized multiple objects are corrected using the calculated global motion information, and the multiple objects are tracked (S400).

As such, according to the embodiment of the present invention, unlike in the conventional single object tracking method, multiple objects are corrected using global motion information so that the performance of the multi-object tracking may be improved.

Figure 5:
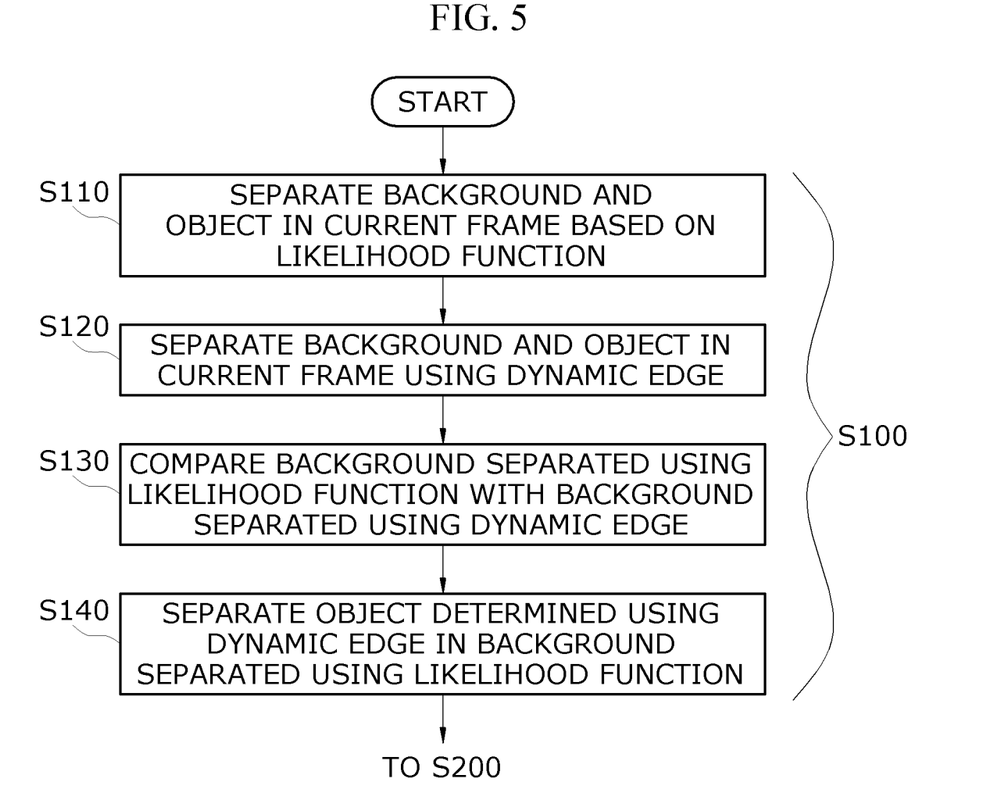
FIG. 5 is a flowchart for describing subdivided operations of an operation of separating a background and multiple objects from each other, employed in an embodiment of the present invention.

FIG. 5 is a flowchart for describing subdivided operations of an operation of separating a background and multiple objects from each other, employed in the embodiment of the present invention.

Referring to FIG. 5, operation S100 of separating the background and the multiple objects from each other employed in the embodiment of the present invention includes separating the background and the multiple objects using the above described Equations 2 and 3.

A background and an object of a current frame are separated from each other on the basis of a likelihood function using a brightness value of a pixel (S110).

A background and an object of the current frame are separated from each other using a dynamic edge (S120).

Subsequently, the background separated using the likelihood function is compared with the background separated using the dynamic edge (S130).

An object determined using the dynamic edge in the comparing operation S130 is separated from the background separated using the likelihood function (S140).

Accordingly, when only using the conventional background separation method based on the likelihood function which uses pixel brightness values, an object lacking motion or momentarily stationary may be processed as background, whereas the embodiment of the present invention may accurately detect even temporarily stationary objects (e.g., an athlete standing still for a moment and the like) by including, in a foreground region, a static Canny edge region detected from a frame, and thus the limitation of an object lacking motion or momentarily stationary being processed as a background is resolved.

Figure 6:
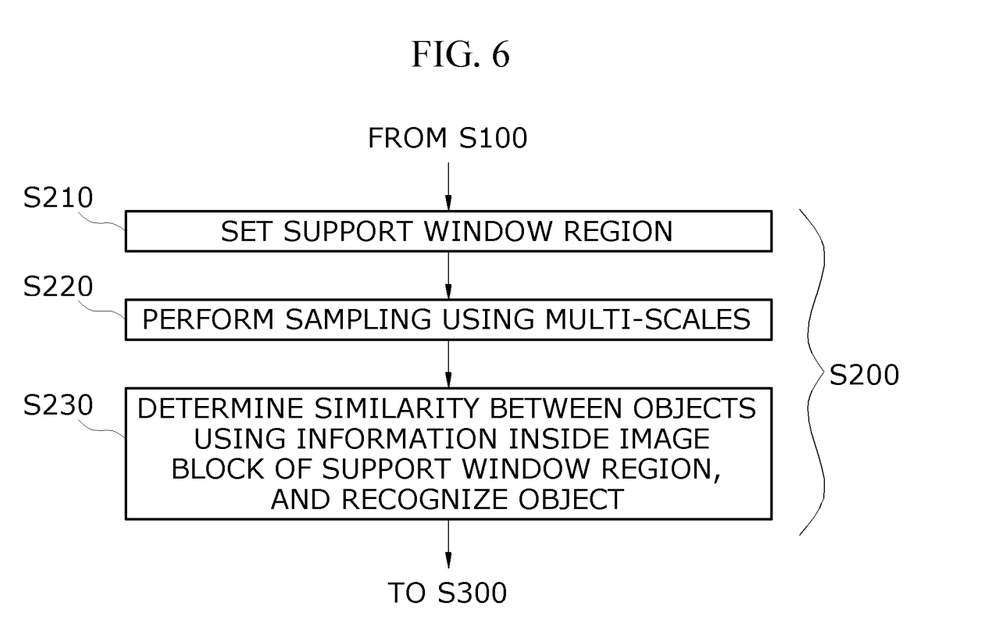
FIG. 6 is a flowchart for describing subdivided operations of an operation (S200) of recognizing multiple objects employed in an embodiment of the present invention.

FIG. 6 is a flowchart for describing subdivided operations of operation S200 of recognizing multiple objects employed in the embodiment of the present invention.

Referring to FIG. 6, a support window region is set using minimum coordinates and maximum coordinates of a connected component (connected component analysis: CCA) within a topological space from object center coordinate information (S210).

Subsequently, sampling using multi-scales is performed on the set support window region (S220).

Then, similarity between objects is determined using information inside of an image block of the set support window region, and the object is recognized (S230).

As such, according to the embodiment of the present invention, the support window region S is set during the tracking of multiple objects so that the object recognition speed and the object update speed may be improved.

Meanwhile, the operation of recognizing multiple objects employed in the embodiment of the present invention may include setting the support window region S using at least one type of information among object center coordinate information p, color information c, speed information v, and size information s as shown in FIG. 2.

Figure 7:
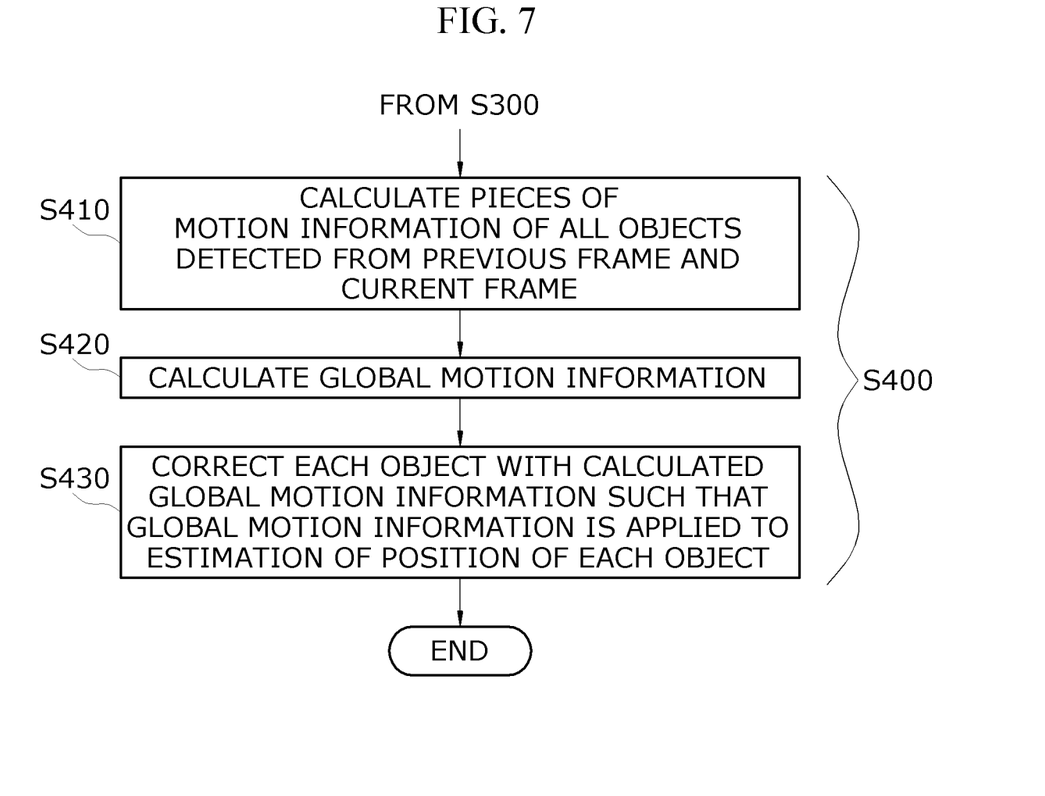
FIG. 7 is a flowchart for describing subdivided operations of an operation (S400) of tracking multiple objects employed in an embodiment of the present invention.

FIG. 7 is a flowchart for describing subdivided operations of operation S400 of tracking multiple objects employed in the embodiment of the present invention.

Referring to FIG. 7, the operation of tracking multiple objects employed in the embodiment of the present invention includes acquiring pieces of motion information of all objects detected from a previous frame and a current frame using the object center coordinate information in the operation S200 of recognizing multiple objects (S410), calculating global motion information (S420), and correcting each of the objects with the calculated global motion information such that the global motion information is applied to an estimation of a position of each of the objects (S430).

According to the embodiment of the present invention, pieces of motion information of all objects detected from a previous frame ((n-1)$^{th}$ frame) and a current frame (n$^{th}$ frame) are acquired using the object center coordinate information in the operation of recognizing multiple objects, global motion information is calculated using the acquired pieces of motion information of all objects, and each of the objects is corrected with the calculated global motion information such that the global motion information is applied to an estimation of a position of each of the objects, thereby enhancing the efficiency of real time multi-object tracking.

Meanwhile, operation S400 of tracking multiple objects may include updating center coordinate information, motion speed information, and size and color information of the object using online interpolation. By updating center coordinate information, motion speed information, and size and color information of the object using online interpolation, an object having been recognized using the object recognition unit 200 may be able to be continuously recognized even in a subsequent frame.

As is apparent from the above, when real time object tracking on an image including multiple objects is performed, the multiple objects are corrected using global motion and multi-object tracking is performed on the corrected multiple objects, so that in an image including the multiple objects with vigorous motion, the multiple objects can be tracked in real time.

According to an embodiment of the present invention, multiple objects can be tracked in real time even for a sporting event image including the multiple objects that are not easily tracked due to frequent occluding each other or due to changes in position.

According to an embodiment of the present invention, a basic technology enabling object analysis in a sporting event is provided, and thus the overall level of the sporting event can be improved, and systematic team management and competitiveness analysis can be promoted.

In addition, according to an embodiment of the present invention, technological competitiveness in the rapidly growing sports image analysis market is provided, and thus great business effects can be expected. In addition, a system of providing athlete-specific quantitative information together with an image is developed, and thus users may be provided with an improved viewing experience quality.

Although the construction of the present invention has been described in detail with reference to the accompanying drawings, the above description of the present invention is for illustrative purposes, and a person having ordinary skilled in the art should appreciate that other specific modifications may be easily made without departing from the technical spirit or essential features of the present invention. Therefore, the scope of the present invention is not defined by the detailed description set forth above but by the accompanying claims of the present invention.

What is claimed is:

1. A method of tracking multiple objects in real time using global motion, the method comprising:
   separating a background and multiple objects from a currently detected image;
   recognizing the multiple objects separated from the background;
   calculating global motion information of the recognized multiple objects, which is information oriented by the multiple objects; and
   correcting the recognized multiple objects using the calculated global motion information, and tracking the corrected multiple objects,
   wherein the recognizing of the multiple objects further comprises:
   setting a support window region by using minimum coordinates and maximum coordinates of a connected component within a topological space from object center coordinate information;
   performing the sampling using multi-scales on the set support window region; and
   determining a similarity between objects using information inside of an image block of the set support window region, and recognizing the object.

2. The method of claim 1, wherein the separating of the background and the multiple objects comprises:
   separating a background and an object of a current frame from each other on the basis of a likelihood function;
   separating a background and an object of the current frame from each other using dynamic edge;
   determining whether the object separated using the dynamic edge is included in the background separated on the basis of the likelihood function; and
   separating, when it is determined in the determination that the object separated using the dynamic edge is included in the background separated on the basis of the likelihood function, a region determined to be the object using the dynamic edge from the background separated on the basis of the likelihood function.

3. The method of claim 1, wherein the calculating of the global motion comprises calculating global motion information using an average value of directions and distances of multiple objects.

4. The method of claim 3, wherein the tracking of the multiple objects comprises:
   acquiring pieces of motion information of all objects detected from a previous frame and a current frame using the object center coordinate information in the recognizing of the multiple objects;
   calculating global motion information; and
   correcting each of the objects using the calculated global motion information such that the global motion information is applied to an estimation of a position of each of the objects.

5. The method of claim 1, wherein the recognizing of the multiple objects comprises recognizing an object using at least one type of information among object center coordinate information, color information, speed information, and size information.

6. The method of claim 1, wherein the tracking of the multiple objects comprises updating center coordinate information, motion speed information, and size and color information of the object using online interpolation.

7. An apparatus for tracking multiple objects in real time using global motion, the apparatus comprising:
   a background separating unit that separates, by a processor, a background and multiple objects from a detected image;
   an object recognition unit that recognizes, by a processor, the multiple objects separated from the background;

a global information calculating unit that calculates, by a processor, global motion information of the recognized multiple objects, which is information oriented by the multiple objects; and an object tracking unit that corrects, by a processor, the recognized multiple objects using the calculated global motion information, and tracks the corrected multiple objects, wherein the object recognition unit sets a support window region by using minimum coordinates and maximum coordinates of a connected component within a topological space from object center coordinate information, performs the sampling using multi-scales on the set support window region, determines a similarity between objects using information inside of an image block of the set support window region, and recognizes the object.

8. The apparatus of claim 7, wherein the background separating unit separates a background and an object of a current frame on the basis of a likelihood function, separates a background and an object of the current frame from each other using dynamic edge, and separates a region determined to be the object using the dynamic edge from the background separated on the basis of the likelihood function when the object separated using the dynamic edge is included in the background separated on the basis of likelihood function.

9. The apparatus of claim 7, wherein the object recognition unit recognizes an object using at least one type of information among object center coordinate information, color information, speed information, and size information.

10. The apparatus of claim 7, wherein the global information calculating unit calculates global motion information using an average value of directions and distances of multiple objects.

11. The apparatus of claim 7, wherein the object tracking unit acquires pieces of motion information of all objects detected from a previous frame and a current frame using the object center coordinate information in the recognizing of the multiple objects, calculates global motion information, and corrects each of the objects using the calculated global motion information such that the global motion information is applied to an estimation of a position of each of the objects.

12. The apparatus of claim 7, wherein the object tracking unit updates center coordinate information, motion speed information, and size and color information of the object using online interpolation.

* * * * *